US012693982B2

(12) United States Patent
Siu et al.

(10) Patent No.: US 12,693,982 B2
(45) Date of Patent: Jul. 28, 2026

(54) HEAP PROTECTION SYSTEM

(71) Applicant: International Business Machines Corporation, Armonk, NY (US)

(72) Inventors: Joran S.C. Siu, Thornhill (CA); Alper Buyuktosunoglu, White Plains, NY (US); Richard H. Boivie, Monroe, CT (US); Tong Chen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 18/063,730

(22) Filed: Dec. 9, 2022

(65) Prior Publication Data
US 2024/0193100 A1 Jun. 13, 2024

(51) Int. Cl.
*G06F 12/14* (2006.01)
*G06F 12/02* (2006.01)

(52) U.S. Cl.
CPC ...... *G06F 12/1441* (2013.01); *G06F 12/0261* (2013.01)

(58) Field of Classification Search
CPC ............. G06F 12/0676; G06F 12/0269; G06F 12/0253; G06F 11/3644; G06F 12/0261; G06F 12/1441; G06F 2212/1032; G06F 12/02; G06F 12/14
See application file for complete search history.

(56) References Cited

U.S. PATENT DOCUMENTS 6,807,551 B2 * 10/2004 Sayag ................. G06F 12/0253
714/E11.2
7,181,585 B2 2/2007 Abrashkevich et al.
7,647,458 B1 * 1/2010 Click, Jr. ............ G06F 12/0269
711/159
7,685,580 B1 * 3/2010 Detlefs ............... G06F 12/0253
717/140

(Continued)

FOREIGN PATENT DOCUMENTS

KR 20200111909 A 10/2020
KR 102324950 B1 11/2021

OTHER PUBLICATIONS

A. Jangda and M. Mishra, "RandHeap: Heap Randomization for Mitigating Heap Spray Attacks in Virtual Machines," 2017 15th Annual Conference on Privacy, Security and Trust (PST), Calgary, AB, Canada, 2017, pp. 169-178. (Year: 2017).*

(Continued)

*Primary Examiner* — Pierre Michel Bataille
(74) *Attorney, Agent, or Firm* — Yee & Associates, P.C.

(57) ABSTRACT
A computer implemented method handles object references. A computer system determines whether an object reference fetched by a load instruction has an expected value for heap protection for a heap in response to receiving the load instruction for execution. The computer system generates an event in response to the object reference not being the expected value, wherein the event is used to manage the object reference. According to other illustrative embodiments, a computer system and a computer program product (Continued)

for managing object references are provided. As a result, the illustrative embodiments can prevent a load instruction from loading an invalid object reference that does not point to a memory location in a heap.

20 Claims, 13 Drawing Sheets

(56) References Cited

U.S. PATENT DOCUMENTS

| | | | | |
|---|---|---|---|---|
| 7,748,007 | B2 * | 6/2010 | Borman | G06F 9/445 |
| | | | | 718/1 |
| 7,827,375 | B2 | 11/2010 | Abrashkevich et al. | |
| 7,886,118 | B2 | 2/2011 | Lyons et al. | |
| 9,021,421 | B1 | 4/2015 | Corry et al. | |
| 9,531,735 | B1 * | 12/2016 | Lukacs | G06F 9/542 |
| 9,804,800 | B2 | 10/2017 | Livne et al. | |
| 9,904,792 | B1 * | 2/2018 | Badishi | G06F 21/554 |
| 10,496,311 | B2 | 12/2019 | Greiner et al. | |
| 10,802,965 | B2 * | 10/2020 | Stephens | G06F 9/30021 |
| 11,080,182 | B2 * | 8/2021 | D'Souza | G06F 9/5016 |
| 11,429,590 | B2 | 8/2022 | Boivie et al. | |
| 12,373,213 | B2 * | 7/2025 | Wilkerson | G06F 9/30105 |
| 2008/0168112 | A1 | 7/2008 | Lyons et al. | |
| 2008/0250088 | A1 * | 10/2008 | Printezis | G06F 12/0276 |
| 2009/0271763 | A1 * | 10/2009 | Varma | G06F 12/145 |
| | | | | 717/114 |
| 2013/0325912 | A1 * | 12/2013 | Corrie | G06F 12/0253 |
| | | | | 707/813 |
| 2016/0378986 | A1 | 12/2016 | Livne et al. | |
| 2017/0344473 | A1 * | 11/2017 | Gidra | G06F 12/0269 |
| 2017/0364452 | A1 * | 12/2017 | Okhravi | G06F 11/1048 |
| 2018/0203618 | A1 | 7/2018 | Greiner et al. | |
| 2018/0203633 | A1 | 7/2018 | Greiner et al. | |
| 2021/0110040 | A1 | 4/2021 | Boivie et al. | |
| 2022/0121644 | A1 | 4/2022 | Boivie et al. | |
| 2022/0357875 | A1 * | 11/2022 | Bialek | G06F 3/0656 |

OTHER PUBLICATIONS

Chi-Min Lin and Tien-Fu Chen, "Dynamic memory management for real-time embedded Java chips," Proceedings Seventh International Conference on Real-Time Computing Systems and Applications, Cheju Island, South Korea, 2000, pp. 49-56. (Year: 2000).*

M. Meyer, "An on-chip garbage collection coprocessor for embedded real-time systems," 11th IEEE International Conference on Embedded and Real-Time Computing Systems and Applications (RTCSA'05), Hong Kong, China, 2005, pp. 517-524. (Year: 2005).*

Chiba, "Java heap protection for debugging native methods," Science of Computer Programming, vol. 70, 2008, Science Direct, pp. 149-167. https://core.ac.uk/download/pdf/81956159.pdf.

Chiba, "Heap protection for Java virtual machines, "PPPJ '06: Proceedings of the 4th international symposium on Principles and practice of programming in Java, Mannheim, Germany, Aug. 30-Sep. 1, 2006, pp. 103-112.

* cited by examiner

COMPUTING ENVIRONMENT
100

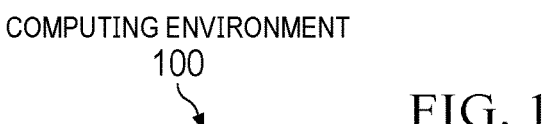

FIG. 1

COMPUTER <u>101</u>

PROCESSOR SET <u>110</u>

120 — PROCESSING CIRCUITRY     CACHE — 121

111 — COMMUNICATION FABRIC

112 — VOLATILE MEMORY

PERSISTENT STORAGE <u>113</u>

122 — OPERATING SYSTEM     INSTRUCTION MANAGER — 190

PERIPHERAL DEVICE SET <u>114</u>

123 — UI DEVICE SET    124 — STORAGE    IoT SENSOR SET — 125

NETWORK MODULE <u>115</u>

103

END USER DEVICE

PRIVATE CLOUD

106

WAN <u>102</u>

REMOTE SERVER

REMOTE DATABASE

130

104

GATEWAY <u>140</u>

PUBLIC CLOUD <u>105</u>

141 — CLOUD ORCHESTRATION MODULE     HOST PHYSICAL MACHINE SET — 142

143 — VIRTUAL MACHINE SET     CONTAINER SET — 144

600 — DETERMINE WHETHER AN OBJECT REFERENCE FETCHED BY A LOAD INSTRUCTION HAS AN EXPECTED VALUE FOR HEAP PROTECTION FOR A HEAP IN RESPONSE TO RECEIVING THE LOAD INSTRUCTION FOR EXECUTION

602 — GENERATE AN EVENT IN RESPONSE TO THE OBJECT REFERENCE NOT BEING THE EXPECTED VALUE

700 — LOAD THE OBJECT REFERENCE IN RESPONSE TO THE OBJECT REFERENCE HAVING THE EXPECTED VALUE

HEAP PROTECTION SYSTEM

BACKGROUND

1. Field

The disclosure relates generally to an improved computer system and more specifically to a method, apparatus, system, and computer program product for managing object references to objects in a heap.

2. Description of the Related Art

A heap is a section of shared memory. The heap is organized as a hierarchical data structure that can be implemented as an array or a binary tree. In Java, heap memory is managed by a Java virtual machine (JVM) to dynamically allocate objects. Objects in the heap are expected only to be accessed by the Java virtual machine executing Java code or during garbage collection processes. The execution of Java code can be interpreted or compiled into binary code using a just-in-time (JIT) compiler.

For performance reasons the heap is often not protected from access by other components that may be executed outside of the Java virtual machine context. Heap corruption can occur for a variety of different reasons such as errors in code, bugs, and other issues can result in errors in referencing objects in the heap. Further, code can also corrupt the heap by writing to addresses within the boundaries of the memory reserved for the heap.

Memory corruption of a heap can result in various issues with program execution. For example, segmentation faults or Java virtual machine assertions can occur. Incorrect program behavior and potential data integrity issues can occur. Further, security exposures can be present from leaking of object or heap data.

Therefore, it would be desirable to have a method, apparatus, computer system, and computer program product that take into account at least some of the issues discussed above, as well as other possible issues. For example, it would be desirable to have a method and apparatus that overcome a technical problem with errors occurring in the execution of programs when references to objects in a heap are corrupt or incorrect.

SUMMARY

According to one illustrative embodiment, a computer implemented method handles object references. A computer system determines whether an object reference fetched by a load instruction has an expected value for heap protection for a heap in response to receiving the load instruction for execution. The computer system generates an event in response to the object reference not being the expected value, wherein the event is used to manage the object reference. According to other illustrative embodiments, a computer system and a computer program product for managing object references are provided. As a result, the illustrative embodiments can prevent a load instruction from loading an invalid object reference that does not point to a memory location in a heap.

The illustrative embodiments can permissively use a check for heap protection and garbage collection. Heap protection control information defines a first range of memory locations for the heap for heap protection. Garbage collection control information defines a second range of memory locations for a subset of the heap for garbage collection. The heap protection control information is used in response to determine whether the object reference has the expected value using the first range of memory locations in response to performing the heap protection. The garbage collection control information is used in response to determine an object reference points to an object in second range of memory locations for the garbage collection in response to performing the garbage collection. As a result, the illustrative embodiments can provide a technical effect of reducing overhead in a computer system through using common components for both garbage collection and heap protection that are configured using control information.

BRIEF DESCRIPTION OF THE DRAWINGS

FIG. 1 is a block diagram of a computing environment in which illustrative embodiments can be implemented;

DETAILED DESCRIPTION

Figure 2:
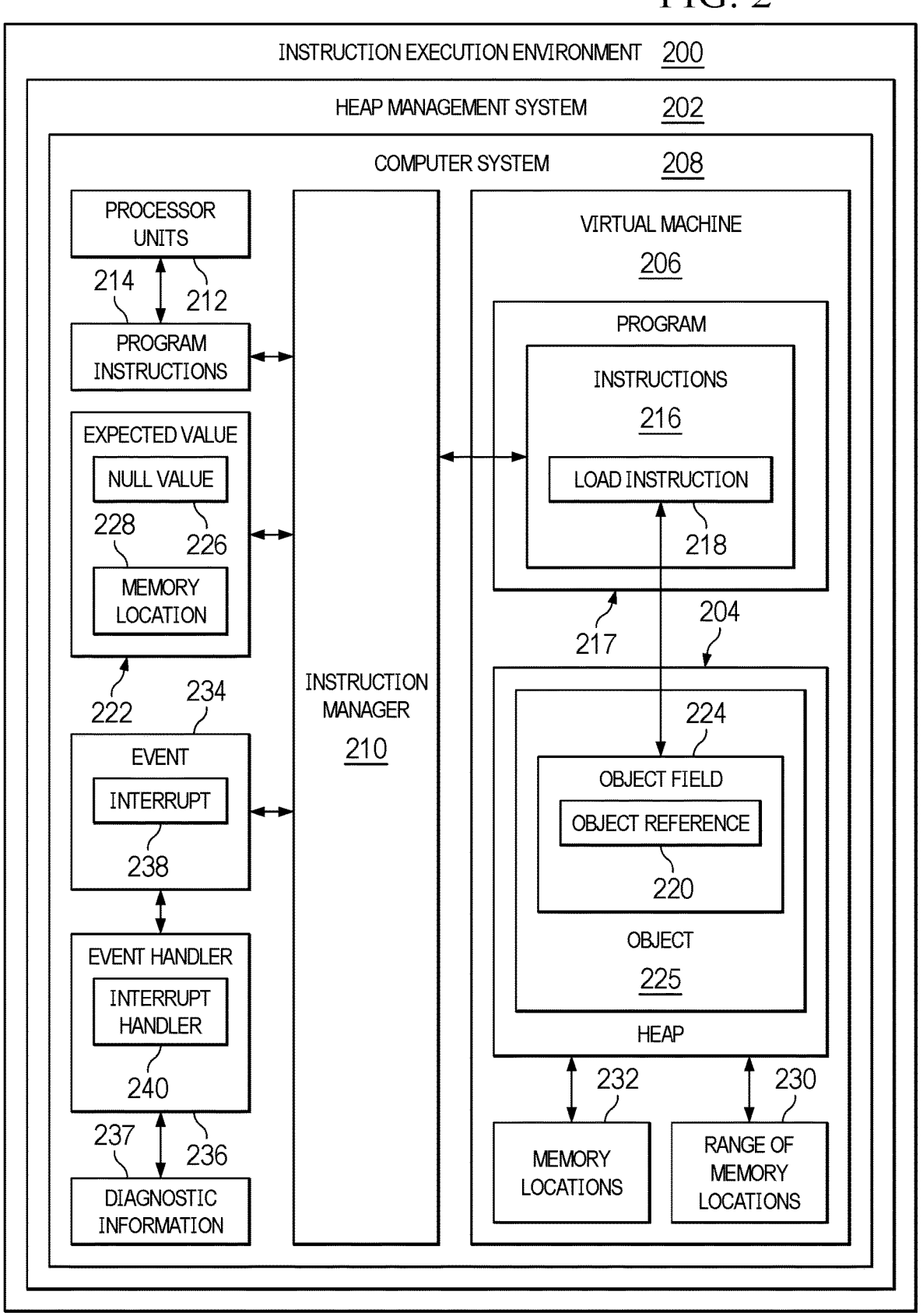
FIG. 2 is a block diagram of an instruction execution environment in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as instruction manager 190. In addition to instruction manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and instruction manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in instruction manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in instruction manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, the illustrative embodiments recognize and take into account that Java object pointers are not directly exposed. However, the heap is not protected for performance reasons. As result, heap corruption can occur with respect to pointers for a number of different reasons. For example, Java virtual machine bugs and just-in-time compiler errors can occur in managing object references. Garbage collection can leave stale pointers because of incorrect object maps. Further, user code can also corrupt a job in the memory by writing data out of the bounds of the heap. For example, an object reference in the heap that points to an object located outside of the heap is not long valid, resulting in corruption in the heap.

These invalid or corrupted object references to objects can cause fatal exceptions, segmentation faults, or propagation of corruption memory corruption. These issues can result in the propagation of corruption to other parts of an application. Thus, the illustrative embodiments recognize and take into account that it is desirable to provide runtime detection of corrupted heap references. In other words, it is desirable to determine whether references to objects in the heap are incorrect during execution of objects outside of garbage collection.

Thus, illustrative embodiments provide a method, apparatus, system, and computer program product for managing object references fetched by load instructions. In one illustrative example, a computer implemented method handles object references. A computer system determines whether an object reference fetched by a load instruction has an expected value for heap protection for a heap in response to receiving the load instruction for execution. The computer system generates an event in response to the object reference not being an expected value, wherein the event is used to manage the object reference. According to other illustrative embodiments, a computer system and a computer program product for managing object references are provided. As a result, the illustrative embodiments can prevent a load instruction from loading an invalid object reference that does not point to a memory location in a heap.

With reference now to FIG. 2, a block diagram of an instruction execution environment is depicted in accordance with an illustrative embodiment. In this illustrative example, instruction execution environment 200 includes components that can be implemented in hardware such as the hardware shown in computing environment 100 in FIG. 1.

In this illustrative example, heap management system 202 in instruction execution environment 200 can operate to manage heap 204. In this example, heap 204 can be located in virtual machine 206. Virtual machine 206 can take a number of different forms. For example, virtual machine 206 can be one of a Java virtual machine, a BEAM, a Common Language Runtime (CLR) and other type of virtual machine.

Heap management system 202 is comprised of a number of different components. As depicted, heap management system 202 includes computer system 208 and instruction manager 210. Instruction manager 210 is located in computer system 208. Instruction manager 210 is an example of an implementation for instruction manager 190 in FIG. 1.

Instruction manager 210 can be implemented in software, hardware, firmware or a combination thereof. When software is used, the operations performed by instruction manager 210 can be implemented in program instructions configured to run on hardware, such as a processor unit. When firmware is used, the operations performed by instruction manager 210 can be implemented in program instructions and data and stored in persistent memory to run on a processor unit. When hardware is employed, the hardware can include circuits that operate to perform the operations in instruction manager 210.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

As depicted, computer system 208 includes a number of processor units 212 that are capable of executing program instructions 214 implementing processes in the illustrative examples. In other words, program instructions 214 are computer readable program instructions.

As used herein, a processor unit in the number of processor units 212 is a hardware device and is comprised of hardware circuits such as those on an integrated circuit that respond to and process instructions and program instructions that operate a computer. A processor unit can be implemented using processor set 110 in FIG. 1. When the number of processor units 212 execute program instructions 214 for a process, the number of processor units 212 can be one or more processor units that are on the same computer or on different computers. In other words, the process can be distributed between processor units 212 on the same or different computers in computer system 208. Further, the number of processor units 212 can be of the same type or different type of processor units. For example, the number of processor units 212 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, instruction manager 210 can manage the execution of instructions 216. In one example, instructions 216 can be for program 217.

Instruction manager 210 can manage the execution of instructions 216 based on references to heap 204. In this illustrative example, instructions 216 are program instructions. When virtual machine 206 takes the form of a Java virtual machine, instructions 216 can be, for example, bytecodes executed by a bytecode interpreter or machine language generated from the byte codes by a just-in-time (JIT) compiler.

For example, in response to receiving load instruction 218 in instructions 216 for execution, instruction manager 210 can determine whether object reference 220 fetched by load instruction 218 from heap 204 has expected value 222 for heap protection for heap 204.

In these examples, an object reference is information on how to find a particular object. The object is a chunk of memory. A reference to the object is a way to get to that chunk of memory. A load instruction is an instruction that can be used to move data in memory or memory address to another location. The location can be, for example, registers, a stack, or some other location.

In this illustrative example, object reference 220 can be located in object field 224 in object 225 in heap 204. When object reference 220 is valid, object reference 220 points to an object 225 in heap 204 or is a null value.

In this example, load instruction 218 can fetch object reference 220 located in object field 224 in object 225 in heap 204 for use in program 217. Instruction manager 210 can check the value of object reference 220 fetched from object field 224 in object 225 in heap 204 to determine whether object reference 220 has expected value 222. In this example, object reference 220 is a live object reference or live pointer. In this example, object reference 220 is a live object reference because object reference 220 is intended to be used during instruction execution. In contrast, object references can become stale or old and ready for removal during garbage collection.

Expected value 222 for object reference 220 can be one of null value 226 or memory location 228 within range of memory locations 230 in heap 204. As depicted, range of memory locations 230 in heap 204 is one of a portion of heap 204 and all of heap 204. In this illustrative example, range of memory locations 230 can be all of memory locations 232 that define heap 204. In another example, range of memory locations 230 can be a subset or some portion of memory locations 232 that define heap 204. When range of memory locations 230 is a subset of memory locations 232, the range can be a discontinuous range or a continuous range of memory locations 232.

In this illustrative example, instruction manager 210 can generate event 234 in response to object reference 220 not being expected value 222. In this example, event 234 is used to manage object reference 220 and event 234 can cause the initiation of event handler 236 to handle the situation in which object reference 220 does not refer to or point to an address within range of memory locations 230 in heap 204. In one illustrative example, event 234 can be interrupt 238 and event handler 236 can be interrupt handler 240.

In one illustrative example, event handler 236 can generate diagnostic information 237 about the object reference and other related information to the object reference in response to event 234.

Diagnostic information can include information such as the object reference, memory location, a system core dump that captures the state of the address space, a heap dumps that captures the state of the heap, files that capture the state of the virtual machine. The state of the virtual machine can include, for example, memory usage, stack threads, classes loaded, and other information about the virtual machine. When the virtual machine is a Java virtual machine, the files can be Javacore files that capture the state of the Java virtual machine (JVM).

In the illustrative example, with the object reference being incorrect or corrupted, event handler 236 can perform a number of different operations in addition to generating diagnostic information. For example, the process can be terminated after diagnostics are collected. As another example, event handler 236 can generate a POSIX signal or condition to notify the invoking native code of the error. For example, if the environment is a job environment, the native code can be, for example, JDBC drivers. As another example in a job environment, event handler 236 can generate a Java RuntimeError and percolate back to the Java application to allow for a graceful termination.

In this depicted example, object reference 220 has been fetched but not loaded when instruction manager 210 determines whether object reference 220 has expected value 222. As a result, if object reference 220 does not have expected value 222, object reference 220 is invalid. The invalid object reference can also be referred to as corrupted. In this case, object reference 220 has not been loaded for use and does not cause problems in the execution of program 217 or other programs.

In response to object reference 220 being expected value 222, object reference 220 is a valid object reference. Instruction manager 210 can load object reference 220 into a location such as a register, stack, or other location for use. After this loading of object reference 220, the execution of instructions 216 for program 217 continues.

Thus, the different illustrative examples can perform checks on load instructions that load live object references that should point to memory locations in a heap. These checks reduce issues with live object references that are invalid.

The checks performed by instruction manager 210 identify invalid object references fetched by load instructions in response to executing the load instructions. In the illustrative examples, a reduction of memory corruption can reduce at least one of fatal exceptions, propagation of corruption to other parts of an application, incorrect program behavior, data integrity issues, security exposures from leaking objects, security exposure from off the data, segmentation faults, or other issues can be reduced.

Figure 3:
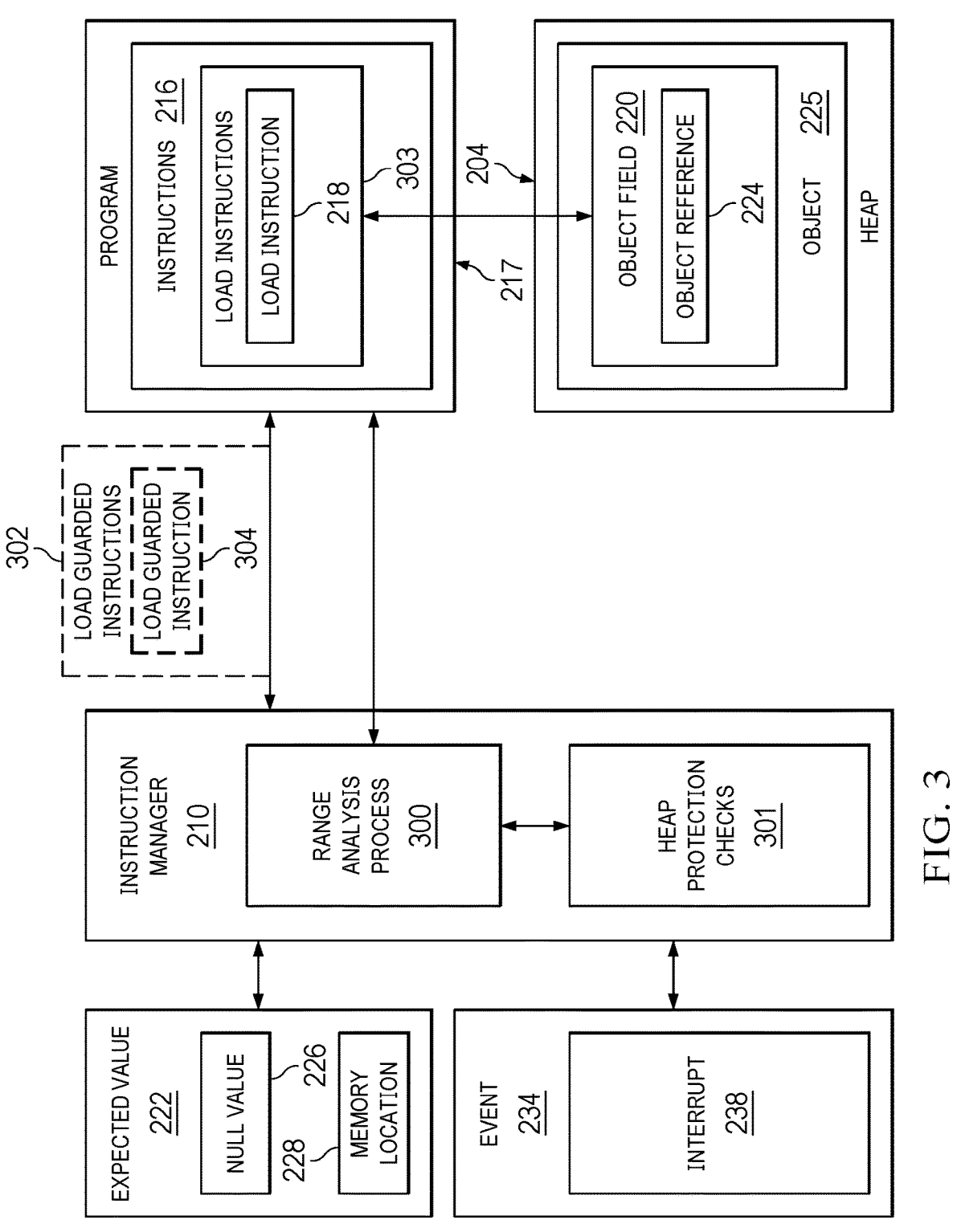
FIG. 3 is a block diagram of illustrating the processing of load instructions in accordance with an illustrative embodiment.

With reference now to FIG. 3, a block diagram illustrating the processing of load instructions is depicted in accordance with an illustrative embodiment. In the illustrative examples, the same reference numeral may be used in more than one figure. This reuse of a reference numeral in different figures represents the same element in the different figures.

In this illustrative example, instruction manager 210 can manage the execution of instructions 216 for program 217 using range analysis process 300 and load guarded instructions 302. In this illustrative example, instruction manager 210 can generate load guarded instructions 302 which can be added to instructions 216 such that load guarded instructions 302 initiate range analysis process 300 in instruction manager 210 to perform heap protection checks 301 in locations in instructions 216 where load guarded instructions 302 are added to program 217.

Range analysis process 300 is a process in instruction manager 210 that can determine whether object reference 220 fetched by load instruction 218 has expected value 222. In one illustrative example, range analysis process 300 performs a heap protection check to determine whether an object reference is a valid object reference. In the depicted example, an object reference is valid when the object reference is null or refers to a memory location in range of memory locations 230 for heap 204. Thus, in this illustrative example, a heap protection check is performed when load instruction 218 in instructions 216 is executed to load object reference 220 from heap 204.

As depicted, load guarded instructions 302 are instructions used to initiate heap protection checks 301 of load instructions 303 in instructions 216 to determine whether object references loaded by load instructions 303 from heap 204 reference correct memory locations in heap 204. These load guarded instructions can be used as hooks to initiate processing of object references fetched by load instructions 303 in instructions 216. For example, load guarded instruction 304 in load guarded instructions 302 can be the instruction or hook that initiates range analysis process 300.

Instruction manager 210 can process instructions 216 prior to execution or during execution to add load guarded instructions 302 to locations where instructions 216 are load instructions that load object references from heap 204. In this example, load instructions that load other types of values other than object references are not checked. For example, a load instruction that loads an integer, a character, or other value that is not an object reference is not checked in this example. These locations of load instructions that load object references are locations in program 217 for performing heap protection checks 301. This adding of load guarded instructions 302 in instructions 216 can also be referred to as instrumentation of instructions 216.

In the illustrative example, load guarded instruction 304 can be added in place of load instruction 218. With this type of instrumentation, load guarded instruction 304 performs the same load operations as load instruction 218. However, load guarded instruction 304 initiates a check of object reference 220 to determine whether the load operation for object reference 220 should be performed. In this illustrative example, load guarded instruction 304 is the same instruction as load instruction 218 with an additional check that is performed prior to performing the load operation of object reference 220.

In another illustrative example, load guarded instruction 304 can be in instruction added to instructions 216 in a location just prior to load instruction 218. With this alternative implementation, load instruction 218 is not replaced by load guarded instruction 304 and load guarded instruction 304 fetches object reference 220 from heap 204 and initiates range analysis process 300 to determine whether object reference 220 in an object field 224 fetched by load instruction 218 has an expected value. If object reference 220 has an expected value, then load instruction 218 is executed. Otherwise, event 234 is generated as described above. In this example, load guarded instruction 304 can fetch the same object reference that load instruction 218 fetches.

Figure 4:
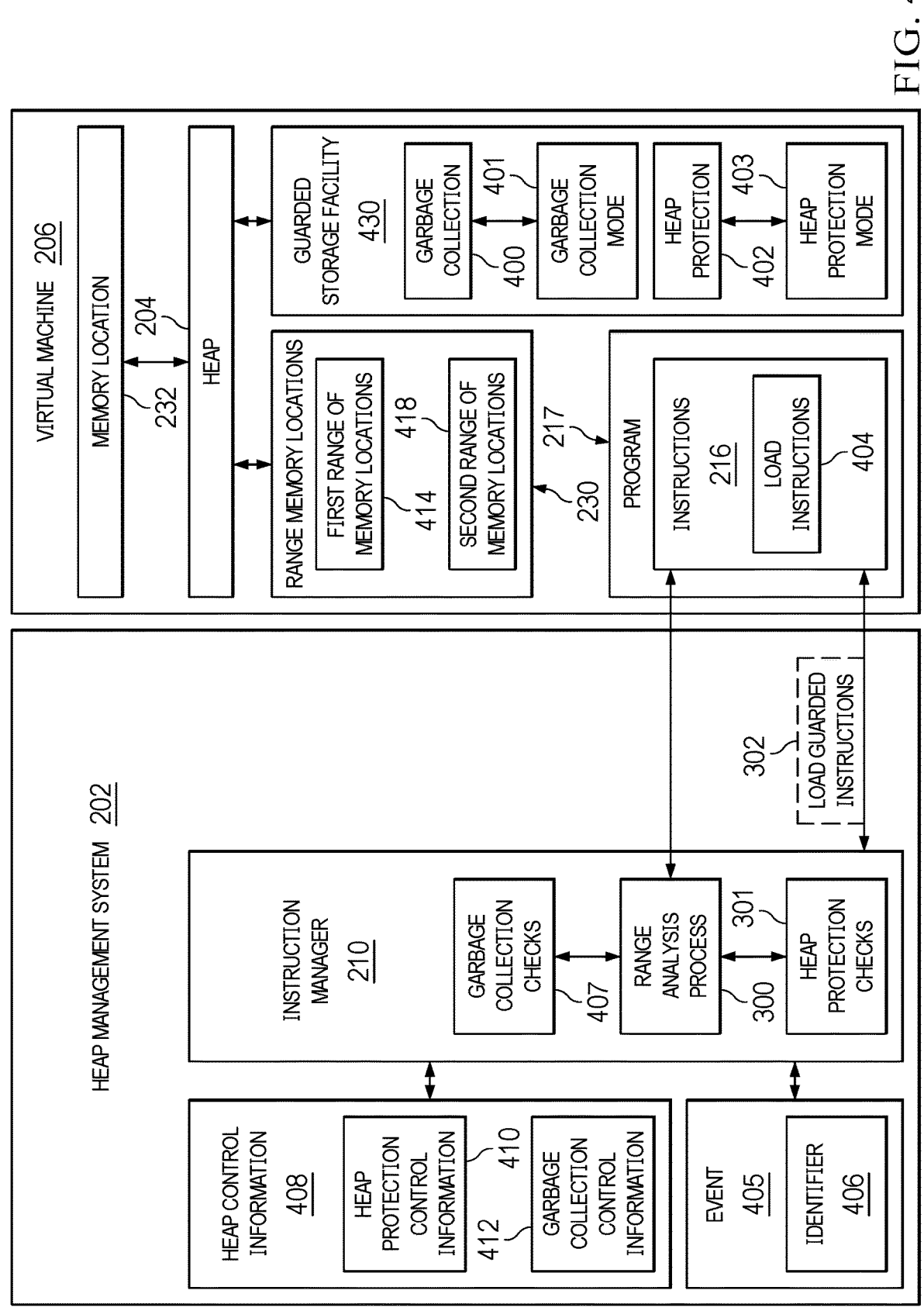
FIG. 4 is a block diagram of a heap management system in accordance with an illustrative embodiment.

With reference to FIG. 4, a block diagram of a heap management system is depicted in accordance with an illustrative embodiment. In this illustrative example, heap management system 202 can perform both garbage collection 400 and heap protection 402 for heap 204. In this illustrative example, garbage collection 400 occurs during garbage collection mode 401 and heap protection 402 occurs during heap protection mode 403. These two modes of operation occur in heap management system 202. In this illustrative example, heap protection mode 403 can be added to an existing guarded storage facility as an additional capability in addition to performing garbage collection 400. In this illustrative example, guarded storage facility 430 can use or include instruction manager 210 to control which mode is active.

In this example, components used for garbage collection 400 can also be used for heap protection 402. For example, load guarded instructions 302 can be used to initiate range analysis process 300 to check load instructions 404 in instructions 216 for program 217 in both garbage collection mode 401 and heap protection mode 403. In other words, a change of instructions or re-instrumenting is not needed to perform both garbage collection 400 and heap protection 402. In this illustrative example, load guarded instructions 302 are the same instructions in the same locations within instructions 216. In other words, load guarded instructions for garbage collection 400 can be same as load guarded instructions for heap protection 402.

This reuse of components can increase the speed of performance and reduce overhead to perform two types of checks on load instructions 404. In this example, range analysis process 300 can also perform garbage collection checks 407 in addition to heap protection checks 301. The type of check performed depends on the mode of operation used which can be garbage collection mode 401 or heap protection mode 403.

In the illustrative example, range analysis process 300 can include two types of logic or sub processes for analyzing object references in load guarded instructions. In heap protection mode 403, event 405 is generated in response to an object reference being not null and being outside of first range of memory locations 414 defining the memory occupied by heap 204. In garbage collection mode 401, event 405 is generated in response to the object reference being within the memory range defined for garbage collection. The type of analysis performed by range analysis process 300 is based on the mode of operation, garbage collection mode 401 and heap protection mode 403.

In garbage collection mode 401, range analysis process 300 determines whether a load instruction references range of memory locations 230 within heap 204. In this implementation, range of memory locations 230 can be a subset of memory locations 232 for heap 204. Range of memory locations 230 can reference a section or sections of heap 204 for which garbage collection 400 is to be performed. Thus, event 405 is generated if a load instruction in load instructions 404 fetches an object reference to range of memory locations 230 in which garbage collection 400 is performed. This event initiates currently used garbage collection processes to update object references pointing to portions of heap 204 designated for garbage collection.

When in heap protection mode 403, range analysis process 300 determines whether the object reference fetched by a load instruction is non-null and outside of heap 204. If the object reference is non-null and outside of heap 204, event 405 is generated.

In this illustrative example, range analysis process 300 and load guarded instructions 302 can be the same components that are used to perform checks for load instructions 404 for both garbage collection 400 and heap protection 402.

In this illustrative example, the range of memory locations 230 checked in heap 204 can be different depending on whether the check is performed during garbage collection mode 401 or heap protection mode 403. As depicted, instruction manager 210 can use range analysis process 300 to make the appropriate range determination using heap control information 408 such as parameters, control blocks, or other control information used to control heap protection checks 301 performed by range analysis process 300.

For example, heap control information 408 can include heap protection control information 410 used for heap protection 402 and garbage collection control information 412 used for garbage collection 400. In this example, heap protection control information 410 defines a first range of memory locations 414 in range of memory locations 230 for heap 204 for heap protection 402. Garbage collection control information 412 defines second range of memory locations 418 in range of memory locations 230. In this depicted example, second range of memory locations 418 can be a subset of range of memory locations 230 that have been designated in heap 204 for garbage collection 400.

For example, during heap protection mode 403, instruction manager 210 uses heap protection control information 410 to determine whether an object reference has the expected value using first range of memory locations 414 in response to performing heap protection 402. When the object reference is non-null and outside the first range of memory locations 414, instruction manager 210 generates event 405 with identifier 406. Identifier 406 can identify a process such as an interrupt handler to generate diagnostic information. Event 405 can include other information such as the load guarded instruction, object reference causing the event, the first range of memory locations 414, a timestamp, and other suitable information.

Further, during garbage collection mode 401, instruction manager 210 uses garbage collection control information 412 to determine whether an object reference points to an object in second range of memory locations 418 for garbage collection 400 in response to performing garbage collection 400. If the object reference points to an object in second range of memory locations 418, instruction manager 210 generates event 405 with identifier 406 identifying a garbage control handler or process to this event. This event can include other information such as the object reference, second range of memory locations 418, and other suitable information that can be used for performing garbage collection 400. Identifier 406 identifies a garbage control handler in response to garbage collection 400 occurring. Identifier 406 identifies an error handler in response to heap protection 402 occurring.

In one illustrative example, garbage collection 400 and heap protection 402 can be implemented in guarded storage facility 430. Guarded storage facility 430 can be a hardware-based feature that allows a program to guard or monitor a number of regions in memory, such that performing a load of an object reference triggers not only the primary operation contemplated in the instruction that makes the object reference but an additional user configurable operation or operations.

For example, a load instruction that performs a load operation that references a region that is guarded is referred to herein as a guarded load. The additional user configurable instructions to presently implemented garbage collection instructions can be used to change configurations for when garbage collection 400 is performed and object reference analysis when heap protection 402 is performed. As a result, garbage collection 400 and heap protection 402 can be performed while a guarded region is in use in other ways.

In one illustrative example, one or more technical solutions are present that overcome a technical problem with invalid or corrupt object references to a heap in situations other than object references that should be cleaned up through garbage collection. As a result, one or more technical solutions may provide a technical effect avoiding execution of load instructions that load invalid object references from a heap. One or more technical solutions are present that provide a technical effect of preventing a load instruction from loading an invalid object reference that does not point to a memory location in a heap.

One or more technical solutions are present that examine an object reference in a load instruction received for execution before the object reference is loaded for use. In one or more illustrative examples, diagnostic information can be collected for the object reference when the reference does not have an expected value. The operations performed by the load instruction can be completed in response to the object reference having the expected value. In the illustrative examples, the expected value is a null value or a memory location that is in the heap.

Computer system 208 can be configured to perform at least one of the steps, operations, or actions described in the different illustrative examples using software, hardware, firmware or a combination thereof. As a result, computer system 208 operates as a special purpose computer system in which instruction manager 210 in computer system 208 enables managing object references fetched by load instructions form a heap. In particular, instruction manager 210 transforms computer system 208 into a special purpose computer system as compared to currently available general computer systems that do not have instruction manager 210.

In the illustrative example, the use of instruction manager 210 in computer system 208 integrates processes into a practical application for managing object references that increases the performance of computer system 208. In other words, instruction manager 210 in computer system 208 is directed to a practical application of processes integrated into instruction manager 210 in computer system 208 that determines whether an object reference in a load instruction received for execution is a valid object reference. The check determines whether the object reference is a null value or points to a memory location within the heap. An event is generated if the object reference is not valid. In this manner, execution errors, security breaches, program faults, and other issues can be reduced in computer system 208.

The illustration of instruction execution environment 200 in the different components in this environment in FIGS. 2-4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, instruction manager 210 can be shown as a component outside of virtual machine 206. In the different illustrative examples, instruction manager 210 can be located in virtual machine 206. As another example, load guarded instructions 302 can be used to instrument or provide hooks for all of load instructions 404. In some illustrative examples, only a portion of load instructions 404 are instrumented using load guarded instructions 302. The particular load instructions that are replaced or otherwise instrumented using load guarded instructions 302 can be selected based on the importance or impact of the particular load instructions. Load instructions 404 in some portions of instructions 216 may not be as important or critical for checking object references.

Figure 5:
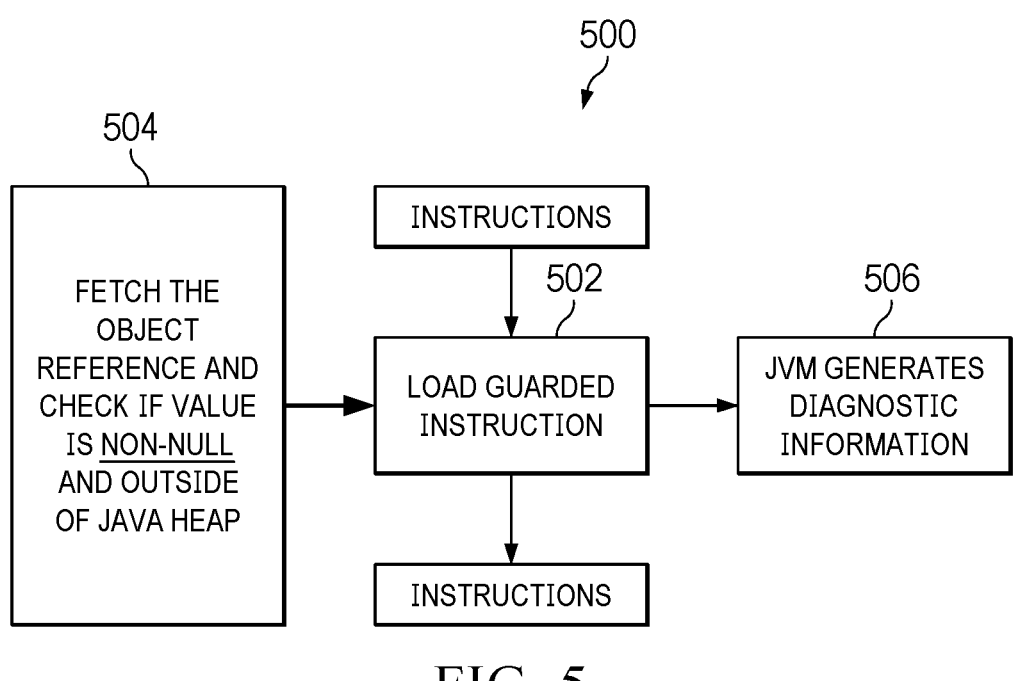
FIG. 5 is a diagram illustrating heap protection in a Java virtual machine in accordance with an illustrative embodiment.

With reference now to FIG. 5, a diagram illustrating heap protection in a Java virtual machine is depicted in accordance with an illustrative embodiment. In this illustrative example, instructions 500 are present in an application for execution. In this example, load guarded instruction 502 is present in instructions 500. Load guarded instruction 502 replaces a load instruction in instructions 500. Load guarded instruction 502 operates as a hook to check in object reference for the load instruction replaced by load guarded instruction 502. In this example, load guarded instruction 502 is the load instruction plus an additional functionality to form an object reference check prior to executing operations to load the object reference fetched by the load instruction.

In response to receiving load guarded instruction 502 for execution. In this example, load guarded instruction 502 fetches the object reference and checks if the value is non-null and outside of the Java heap (step 504). In step 504, fetching means that a read from the heap memory occurs and fetching the object reference means that the value of the object reference if read from the field location in an object in the heap memory. If the value of the object reference is non-null and outside of the Java heap, the JVM generates diagnostic information (step 506). The execution of instructions 500 can resume or terminate after checking load guarded instruction 502.

If the value for the object reference is within the Java heap, the object reference is loaded for use. The object reference can be loaded into a stack or a register. Execution of instructions 500 located after load guarded instruction 502 continue to execute.

In this example, the checking of the object reference in load guarded instruction 502 can maintain a paradigm in which an object reference in a stack or registers are a Java heap reference. In other words, the object reference loaded into a stack or registers points to the Java heap.

Figure 6:
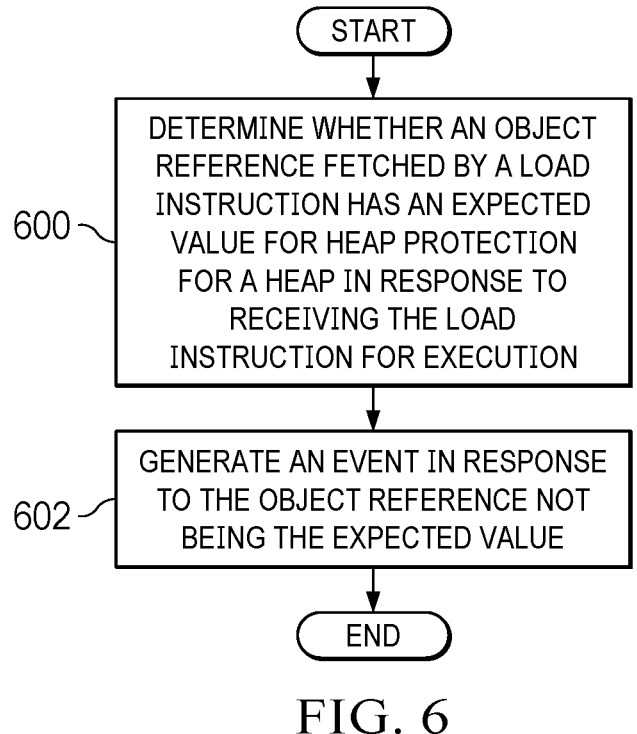
FIG. 6 is a flowchart of a process for managing object references in accordance with an illustrative embodiment.

Turning next to FIG. 6, a flowchart of a process for managing object references is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in instruction manager 210 in computer system 208 in FIG. 2.

The process begins by determining whether an object reference fetched by a load instruction has an expected value for heap protection for a heap in response to receiving the load instruction for execution (step 600). In step 600, the object reference is fetched from the heap. The expected value for the object reference is one of a null value and a memory location within a range of memory locations in the heap. If either a null value is present or the memory location is within the range of memory locations in the heap, then the load instruction has the expected value. In this illustrative example, the range of memory locations in the heap is one of a portion of the heap and all of the heap.

The process generates an event in response to the object reference not being the expected value (step 602). The process terminates thereafter. In step 602, the event is used to manage the object reference. For example, the event can be an interrupt to an interrupt handler that generates diagnostic information relating to the object reference.

In this process, the object reference is not loaded in response to a determination that the object reference does not have an expected value.

Figure 7:
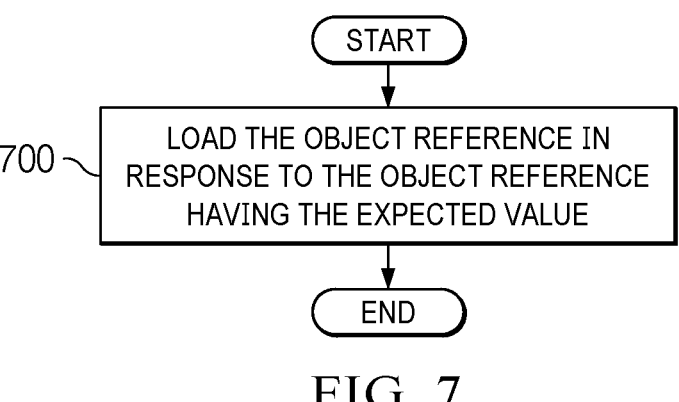
FIG. 7 is a flowchart of a process for loading an object reference in accordance with an illustrative embodiment.

With reference to FIG. 7, a flowchart of a process for loading an object reference is depicted in accordance with an illustrative embodiment. This flowchart illustrates an additional step that can be performed with the steps in FIG. 6.

The process loads the object reference in response to the object reference having the expected value (step 700). The process terminates thereafter. In step 700, the object reference can be loaded into a location for other instructions. Location can be, for example, a register, a stack, or some other suitable location. This step can be performed to complete the loading of the object reference after the object reference has been fetched from the heap and the object reference has been checked and determined to be valid.

Figure 8:
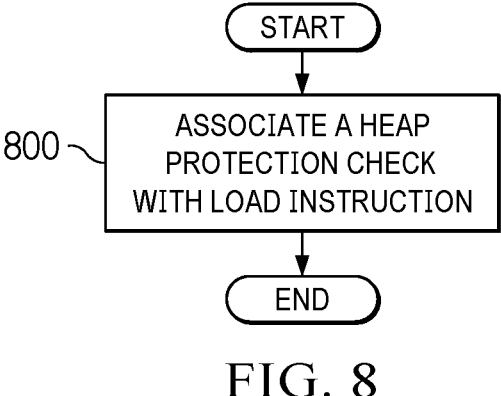
FIG. 8 is a flowchart of a process for loading an object reference in accordance with an illustrative embodiment.

In FIG. 8, a flowchart of a process for loading an object reference is depicted in accordance with an illustrative embodiment. This flowchart illustrates an additional step that can be performed with the steps in FIG. 6.

The process associates a heap protection check with load instruction (step 800). The process terminates thereafter.

Figure 9:
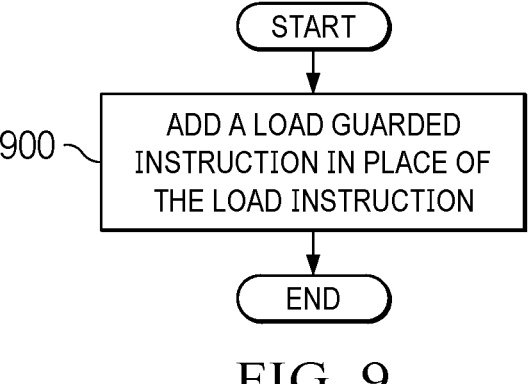
FIG. 9 is a flowchart of a process for loading an object reference in accordance with an illustrative embodiment.

Turning now to FIG. 9, a flowchart of a process for loading an object reference is depicted in accordance with an illustrative embodiment. This flowchart illustrates an example of an implementation for step 800 in FIG. 8.

The process adds a load guarded instruction in place of the load instruction (step 900). The process terminates thereafter.

In step 900, the load guarded instruction causes a check of the object reference prior to completing a load of the object reference from the heap. With the load guarded instruction, the load of the object reference is in response to the object reference having an expected value.

Figure 10:
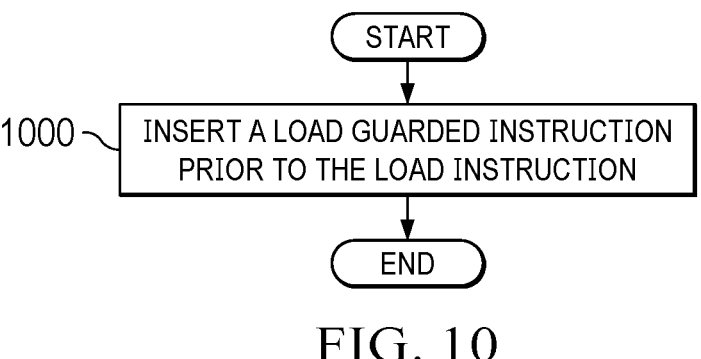
FIG. 10 is a flowchart of a process for loading an object reference in accordance with an illustrative embodiment.

Turning now to FIG. 10, a flowchart of a process for loading an object reference is depicted in accordance with an illustrative embodiment. This flowchart illustrates an example of an implementation for step 800 in FIG. 8.

The process inserts a load guarded instruction prior to the load instruction (step 1000). The process terminates thereafter. In step 1000, the load guarded instruction causes a check of the object reference fetched by the load instruction.

Figure 11:
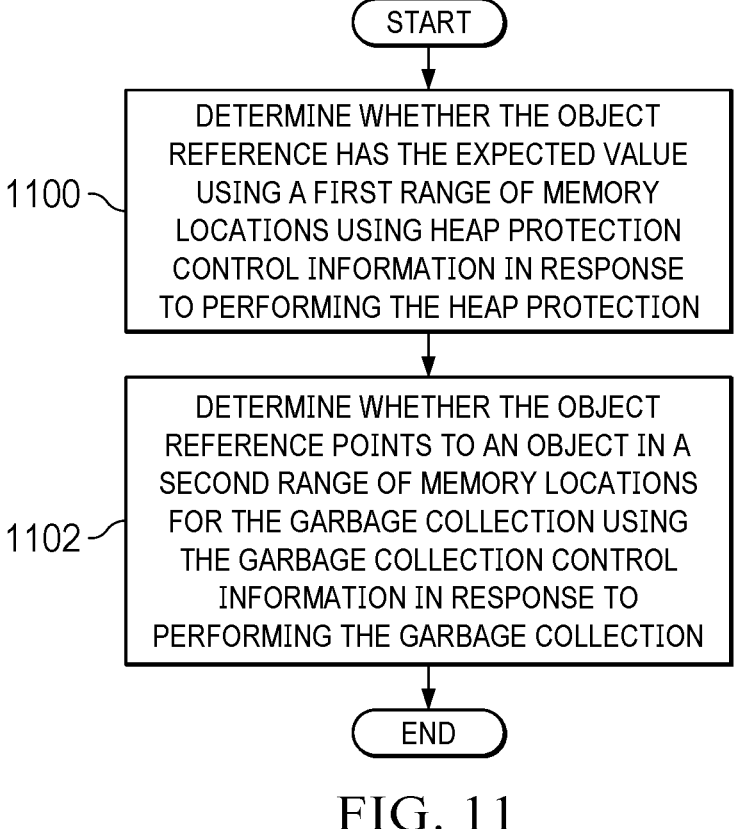
FIG. 11 is a flowchart of a process for loading an object reference in accordance with an illustrative embodiment.

With reference to FIG. 11, a flowchart of a process for loading an object reference is depicted in accordance with an illustrative embodiment. This flowchart illustrates additional steps that can be performed with the steps in FIG. 8. In this process, a heap protection check can be used for both heap protection and garbage collection. A heap protection control information defines a first range of memory locations for the heap for performing heap protection. Garbage collection control information defines a second range of memory locations for a subset of the heap for performing garbage collection.

The process determines whether the object reference has the expected value using a first range of memory locations using heap protection control information in response to performing the heap protection (step 1100). The process determines whether the object reference points to an object in a second range of memory locations for the garbage collection using the garbage collection control information in response to performing the garbage collection (step 1102). The process terminates thereafter.

Thus, the same process determining whether an object reference is a valid object reference during heap protection can be used to determine whether an object reference points to an object in which garbage collection is being performed. In this example, the second load guarded instruction or the load instruction being evaluated in both the garbage collection mode and the heap protection mode can be used without changes. The proper determination can be made through the use of heap protection control information in the heap protection mode and garbage collection control information during the garbage collection mode. As a result, the same components and instrumentation of hooks can be used to perform both garbage collection and heap protection in this illustrative example.

Figure 12:
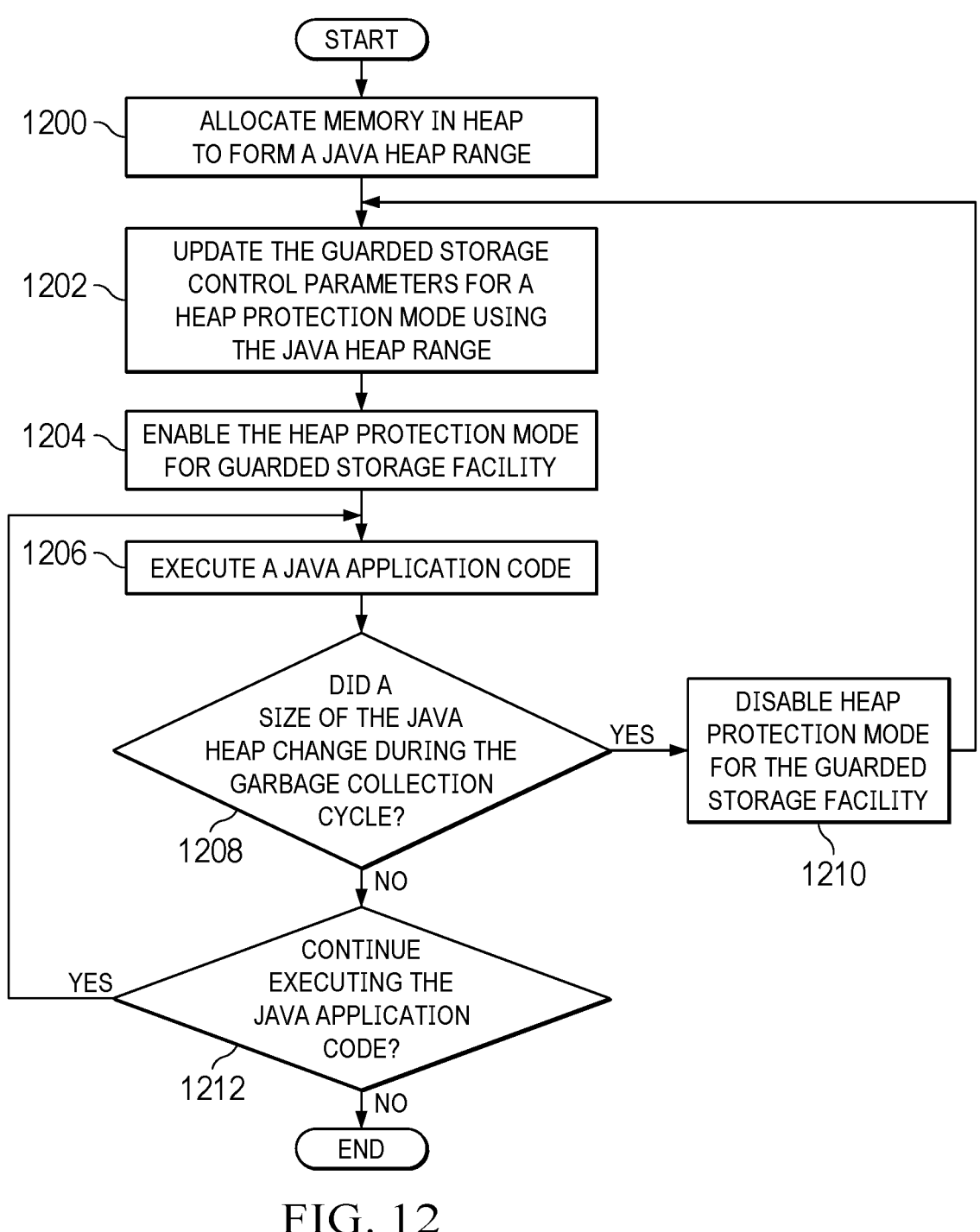
FIG. 12 is a flowchart of a process for managing guarded storage control blocks for a guarded storage facility in according with an illustrative embodiment.
Figure 13:
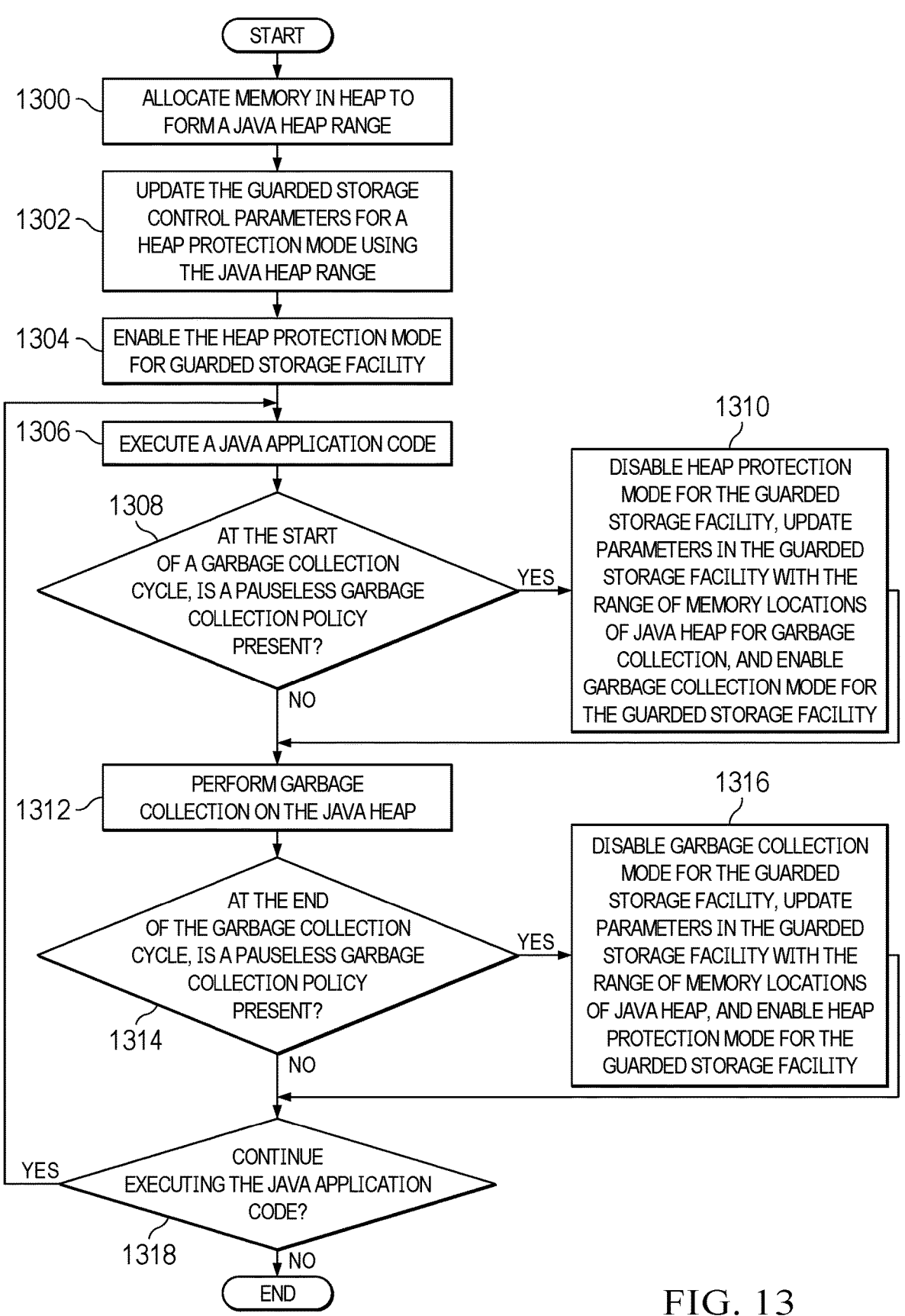
FIG. 13 is a flowchart of a process for managing a heap using two modes for guarded storage facility in accordance with an illustrative embodiment.
Figure 14:
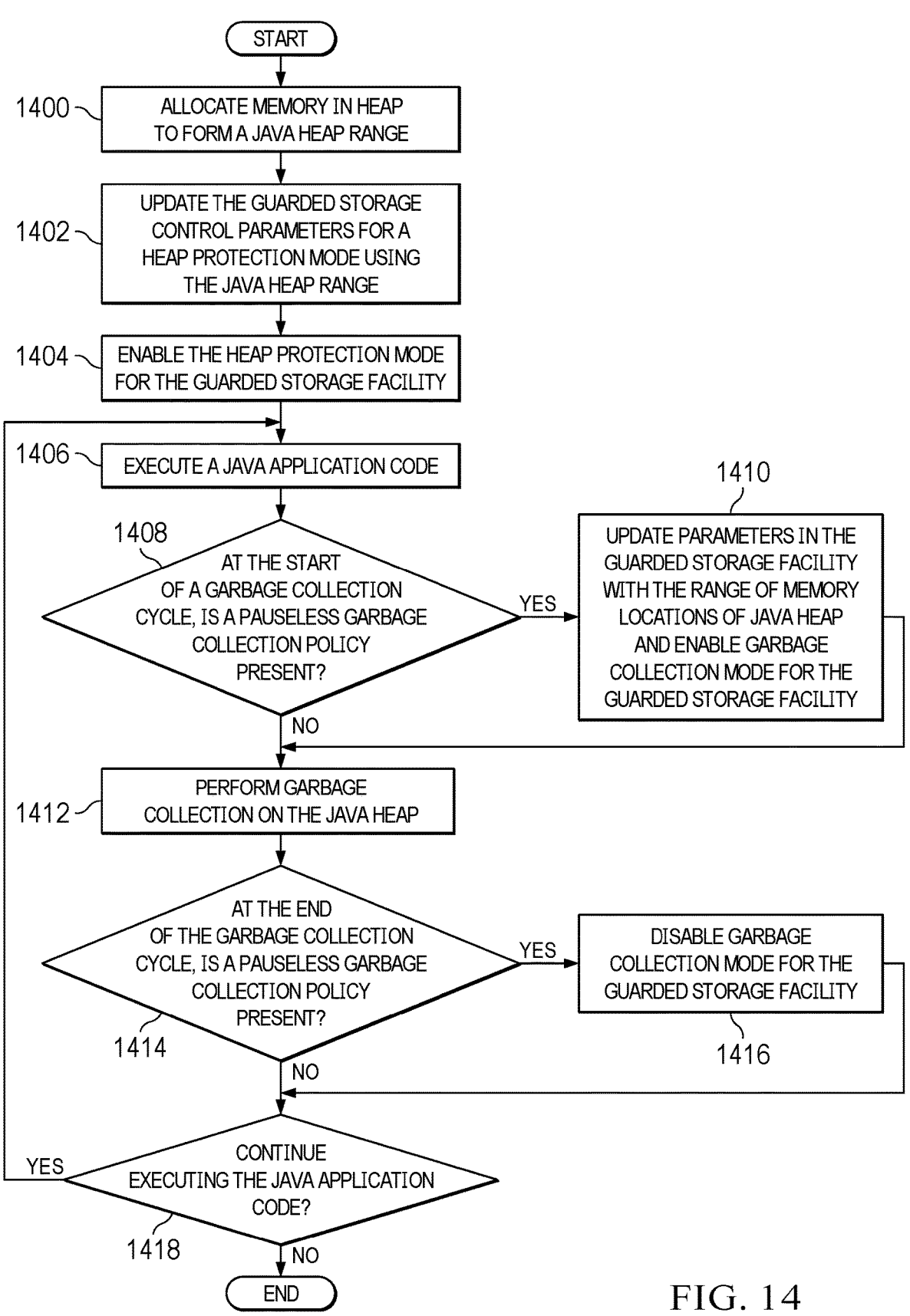
FIG. 14 is a flowchart of a process for managing heap by concurrently running two modes for a guarded storage facility in accordance with an illustrative embodiment.
Figure 15:
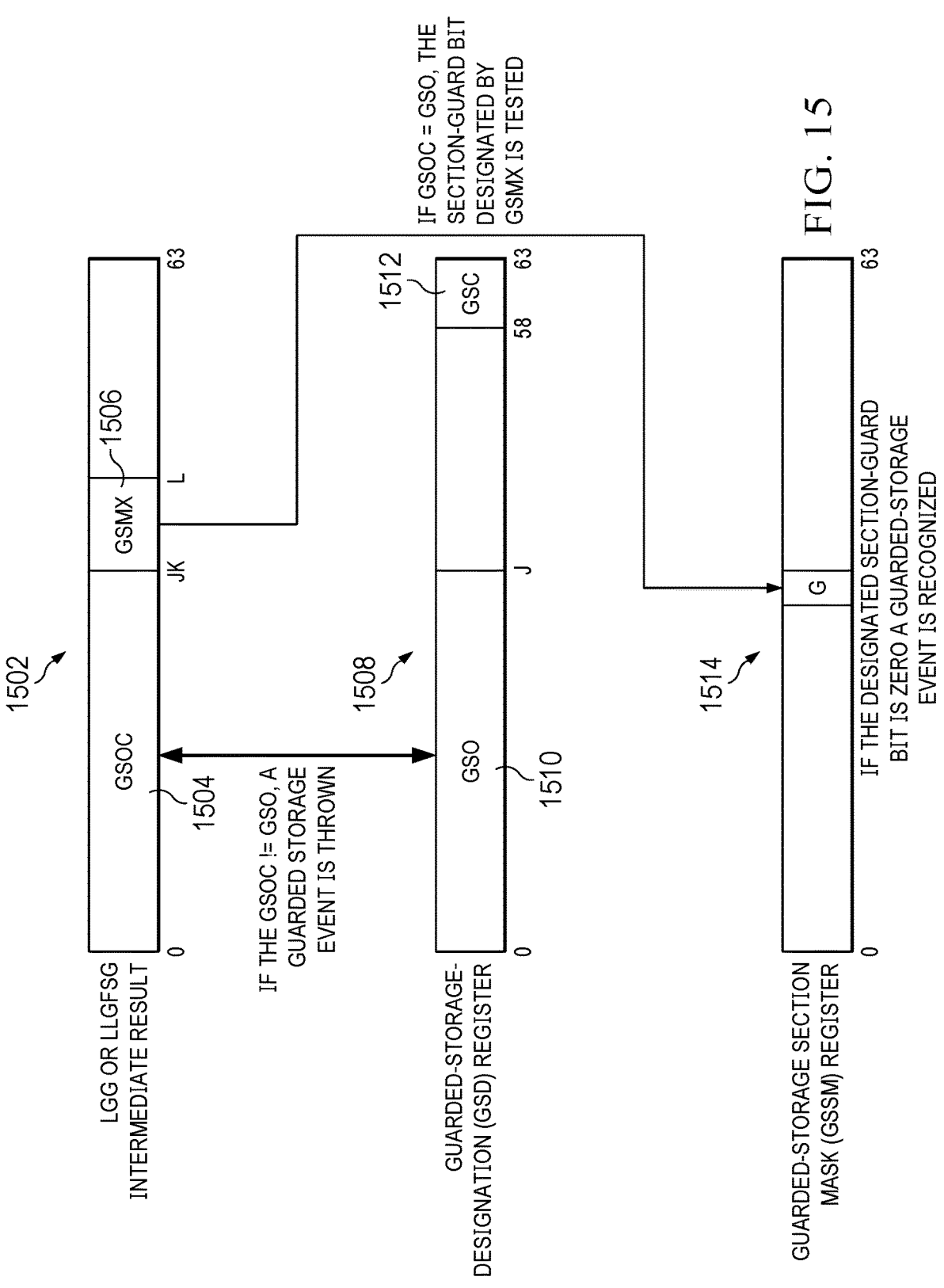
FIG. 15 is a diagram illustrating detecting of an event in heap protection mode using guarded storage facility implemented with heap protection check in accordance with an illustrative embodiment.

FIGS. 12-14 are flowcharts illustrating steps and FIG. 15 is a block diagram illustrating dataflow for performing garbage collection and heap protection in a guarded storage facility. These different steps can be implemented using instruction manager 210 in heap management system 202 with guarded storage facility 430 in FIG. 4. In the different illustrative examples, a garbage collection mode and a heap management mode can be implemented using common components in guarded storage facility 430. In this manner overhead can be reduced in a computer system through using common components for both garbage collection and heap protection that are configured using control information.

Turning next to FIG. 12, a flowchart of a process for managing guarded storage control blocks for a guarded storage facility is depicted in accordance with an illustrative embodiment. The process in FIG. 12 can be implemented in hardware, software, or both. When implemented in software, the process can take the form of program instructions that is run by one of more processor units located in one or more hardware devices in one or more computer systems. For example, the process can be implemented in instruction manager 210 in heap management system 202 in FIG. 2.

The process begins by allocating memory in heap to form a Java heap range (step 1200). In step 1200, the java heap range is a range of memory locations, such as range of memory locations 230 for heap 204 in FIG. 2.

The process updates the guarded storage control parameters for a heap protection mode using the java heap range (step 1202). In step 1202, the process updates parameters in guarded storage facility with the range of memory locations that are used for range analysis in the heap protection mode. The range of memory locations that define the Java heap are used to determine whether object references are valid in this example. These parameters can be heap protection control information 410 in heap control information 408 in FIG. 4.

The process enables the heap protection mode for guarded storage facility (step 1204). In step 1204, the heap protection mode provides heap protection using a range analysis process that determines whether object reference fetched by a load instruction is non-null and outside of the Java heap range using a heap protection check.

The process executes Java application code (step 1206). The process determines whether a change to the size of Java heap occurred during the garbage collection cycle (step 1208). In step 1208, a change in the size of the Java heap can be either a heap expansion or a heap contraction.

If the size of Java heap does not change during the garbage collection cycle, the process proceeds to determine whether to continue executing the Java application code (step 1212). If the Java application code does not continue execution, the process terminates.

With reference again to step 1208, if the size of the Java heap changes during the garbage collection cycle, the process disables heap protection mode for the guarded storage facility (step 1210).

The process proceeds to step 1202 as described above. In this example, step 1202 is repeated to update the parameters used in the heap protection mode to contain the current range of memory locations for the Java heap.

With reference again to step 1212, if Java application code continues execution, the process proceeds to step 1206.

Turning next to FIG. 13, a flowchart of a process for managing a heap using two modes for guarded storage facility is depicted in accordance with an illustrative embodiment. The process in FIG. 13 can be implemented in hardware, software, or both. When implemented in software, the process can take the form of program instructions that are run by one of more processor units located in one or more hardware devices in one or more computer systems. For example, the process can be implemented in instruction manager 210 in heap management system 202 in FIG. 2.

The process illustrated in this flowchart can be used with a pauseless garbage collection system. In this example, one of the garbage collection mode and the heap protection mode is active at one time. Both modes are not active at the same time in this depicted example.

The process begins by allocating memory in the heap to form a Java heap range (step 1300). The process updates guarded storage control parameters for a heap protection mode using the java heap range (step 1302). In step 1302, the process updates parameters in guarded storage facility with the range of memory locations that are used for range analysis during the heap protection mode. The range of memory locations that define the Java heap are used to determine whether object references are valid in this example. These parameters can be heap protection control information 410 in heap control information 408 in FIG. 4.

The process enables the heap protection mode for guarded storage facility (step 1304). In step 1304, the heap protection mode ensures heap protection by performing a range analysis for determining whether object reference fetched by a load instruction is non-null and outside of the Java heap range using a heap protection check.

The process executes a Java application code (step 1306). At the start of a garbage collection cycle, the process determines whether a pauseless garbage collection policy is present (step 1308). In step 1308, the pauseless garbage policy can be implemented with any suitable garbage collection algorithm that improves the response time for Java application during a garbage collection cycle, for example, an algorithm of a garbage collection mode to perform garbage collection 400 in FIG. 4.

If a pauseless garbage collection policy is present, the process disables heap protection mode for the guarded storage facility, updates parameters in the guarded storage facility with the range of memory locations of the Java heap for garbage collection, and enables garbage collection mode for the guarded storage facility (step 1310). In step 1310, the range of memory locations identified is a subset of the Java heap for which garbage collection is to be performed. The process performs garbage collection on the Java heap (step 1312).

With reference again to step 1308, if a pauseless garbage collection policy is not present, the process proceeds to step 1312. In step 1312, garbage collection performed on Java heap can be performed with either the garbage collection mode that enables pauseless garbage collection, or without the garbage collection mode.

At the end of the garbage collection cycle, the process determines whether a pauseless garbage collection policy is present (step 1314). If the pauseless garbage collection policy is present, the process disables garbage collection mode for the guarded storage facility, updates parameters in the guarded storage facility with the range of memory locations of Java heap, and enables heap protection mode for the guarded storage facility (step 1316). The process determines whether to continue executing the Java application code (step 1318).

If the Java application code continues execution, the process returns to step 1306. Otherwise, the process terminates. With reference again to step 1314, if a pauseless garbage collection policy is not present, the process proceeds to step 1318 as described above.

Turning next to FIG. 14, a flowchart of a process for managing heap by concurrently running two modes for a guarded storage facility is depicted in accordance with an illustrative embodiment. The process in FIG. 14 can be implemented in hardware, software, or both. When implemented in software, the process can take the form of program instructions that are run by one of more processor units located in one or more hardware devices in one or more computer systems. For example, the process can be implemented in instruction manager 210 in heap management system 202 in FIG. 2. The process illustrated in this flowchart can be used with a pauseless garbage collection system. In this example, both the garbage collection mode and the heap protection mode can be active at the same time. In other words, detection of object references for both garbage collection and heap protection can be performed in parallel.

The process begins by allocating memory in a heap to form a Java heap range (step 1400). The process updates the guarded storage control parameters for a heap protection mode using the java heap range (step 1402). In step 1402, the process updates parameters in guarded storage facility with the range of memory locations that are used for range analysis in the heap protection mode. The range of memory locations that define the Java heap are used to determine whether object references are valid in this example. These parameters can be heap protection control information 410 in heap control information 408 in FIG. 4.

The process enables heap protection mode for the guarded storage facility (step 1404). In step 1404, heap protection mode ensures heap protection by performing a range analysis for determining whether object reference fetched by a load instruction is non-null and outside of the Java heap range using a heap protection check.

The process executes a Java application code (step 1406). At the start of a garbage collection cycle, the process determines whether a pauseless garbage collection policy is present (step 1408). In step 1408, the pauseless garbage policy can be implemented with any suitable garbage collection algorithm that improves the response time for Java application during a garbage collection cycle, for example, an algorithm of a garbage collection mode to perform garbage collection 400 in FIG. 4.

If a pauseless garbage collection policy is present, the process updates parameters in the guarded storage facility with the range of memory locations of Java heap and enables garbage collection mode for the guarded storage facility (step 1410). The process performs garbage collection on the Java heap (step 1412).

With reference again to step 1408, if a pauseless garbage collection policy is not present, the process proceeds to step 1412. At the end of the garbage collection cycle, the process determines whether a pauseless garbage collection policy is present (step 1414). If the pauseless garbage collection policy is present, the process disables garbage collection mode for the guarded storage facility (step 1416). The process determines whether to continue executing the Java application code (step 1418). If the Java application code continues execution, the process returns to step 1406. Otherwise, the process terminates.

With reference again to step 1414, if a pauseless garbage collection policy is not present, the process proceeds to step 1418 as described above.

Turning next to FIGS. 15, a diagram illustrating detecting of an event in heap protection mode using guarded storage facility implemented with heap protection check is depicted in accordance with an illustrative embodiment. In this illustrative example, the detection of an event can be an example of range analysis process 300 from FIG. 3.

In this illustrative example, guarded storage facility generates an intermediate result 1502 for an object reference fetched by load guarded instruction. In this example, the intermediate result 1502 can be a value of 64-bits address that points to a location of memory for the object reference fetched by the loaded guarded instruction. In this illustrative example, intermediate result 1502 includes guarded storage operand comparand (GSOC) 1504 that indicates the bit positions of memory address in the heap for the object reference fetched by the load guarded instruction. In this example, intermediate result 1502 has an origin address bit 0 and an upper address bit J. Intermediate result 1502 also includes guarded storage mask index (GSMX) 1506 that includes information regarding the mask to intermediate result 1502.

In this example, guarded storage facility compares guarded storage operand comparand (GSOC) 1504 with guarded storage operand (GSO) 1510 in guarded storage designation (GSD) register 1508. Guarded storage designation (GSD) register 1508 defines a range of memory in heap that is protected under heap protection mode. For example, memory in heap that are protected under heap protection mode is defined by guarded storage operand (GSO) 1510 with an origin address bit 0 and an upper address bit J in guarded storage designation (GSD) register 1508. In other words, the comparison between guarded storage operand comparand (GSOC) 1504 in intermediate result 1502 and guarded storage operand (GSO) 1510 in guarded storage designation (GSD) register 1508 determines whether the intermediate result 1502 falls within the range of memory that is protected under heap protection.

In this illustrative example, guarded storage designation (GSD) register 1508 includes guarded storage characteristic (GSC) 1512 that identifies the size of 64 contiguous sections of memory in heap. Guarded storage characteristic (GSC) 1512 also defines the alignment requirements for the origin address for guarded storage operand (GSO) 1510 when comparing the guarded storage operand comparand (GSOC) 1504 in intermediate result 1502 to guarded storage operand (GSO) 1510 in guarded storage designation (GSD) register 1508.

Under heap protection mode for the guarded storage facility, the intermediate result 1502 falls within the range of memory that is protected under heap protection if guarded storage operand comparand (GSOC) 1504 in intermediate result 1502 does not equal to guarded storage operand (GSO) 1510 in guarded storage designation (GSD) register 1508.

If intermediate result 1502 falls within the range of memory that is protected under heap protection, the guarded storage facility proceeds to test a section-guarded bit designated by guarded storage mask index (GSMX) 1506 using guarded storage section mask (GSSM) register 1514 to determine whether intermediate result 1502 is within an active region of range of memory that is protected under heap protection. In this illustrative example, guarded storage section mask (GSSM) register 1514 includes information regarding active mask that denotes which of the 64 contiguous sections are actively guarded and can recognize an event.

In this illustrative example, an option is present to specify a single section or sections of the range of memory in heap to be protected under heap protection. In other words, the specified sections are active regions of memory in heap for heap protection, and the sections that are not specified are inactive and not protected.

In this example, an event is recognized if the designated section-guarded bit designated by the guarded storage mask index is zero. In one illustrative example, triggered event can initiate event handler for managing object reference. For example, the event can be an interrupt to event handler in the form of an interrupt handler that generates diagnostic information about the object reference and other related information to the object reference. In this illustrative example, information regarding the triggered event is logged in an event parameter list. In this example, the event parameter list can include instruction, operand, and return addresses of the instruction causing the triggered event, a cause indicator denoting type of instruction to cause the triggered event and whether the triggered event happened within a transaction and the intermediate result containing the value of the memory operand used in comparison.

In these examples, the heap protection mode reuses components in the guarded storage facility used for garbage collection. In both modes, the hooks triggering the evaluation of object references are load guarded instructions. The same load guarded instructions can be used for both modes in the same locations. As another example, guarded storage designation registers 1508 can be used for both garbage collection and heap protection. In garbage collection, this register identifies the portion of the key that is undergoing garbage collection. In heap protection, this register identifies the extent of the keep. In other words, the register contains the memory location for the entire heap in this depicted example.

In this illustrative example, guarded storage section mask register 1514 also can be used for both garbage collection and heap protection. For example, in heap protection the section guarded is also set to zero to indicate the presence of an event. Further, the guarded storage event parameter list (not shown) can be updated with the new handler address for the invalid object reference to the heap for the handler that collects diagnostic information.

With garbage collection in the garbage collection mode in the guarded storage facility, an event is generated if value from an object reference fetched by a load instruction equals the value of the region of the Java heap designated for garbage collection. In the heap protection mode in the guarded storage facility, an event is generated if the field value of an object reference fetched by a load instruction does not equal to the value of the guarded region. Thus, the existing garbage collection mode and the heap protection mode for the guarded storage facility use common components. In the examples, both modes can be enabled at the same time and run concurrently without interference.

Thus, in one illustrative example, a garbage collection mode and a heap management mode can be implemented using common components in a guarded storage facility. In this manner overhead can be reduced in a computer system using common components for both garbage collection and heap protection that are configured to perform garbage collection of heap protection using control information. Further, the illustrative examples also employ the same guarded load instructions.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 16:
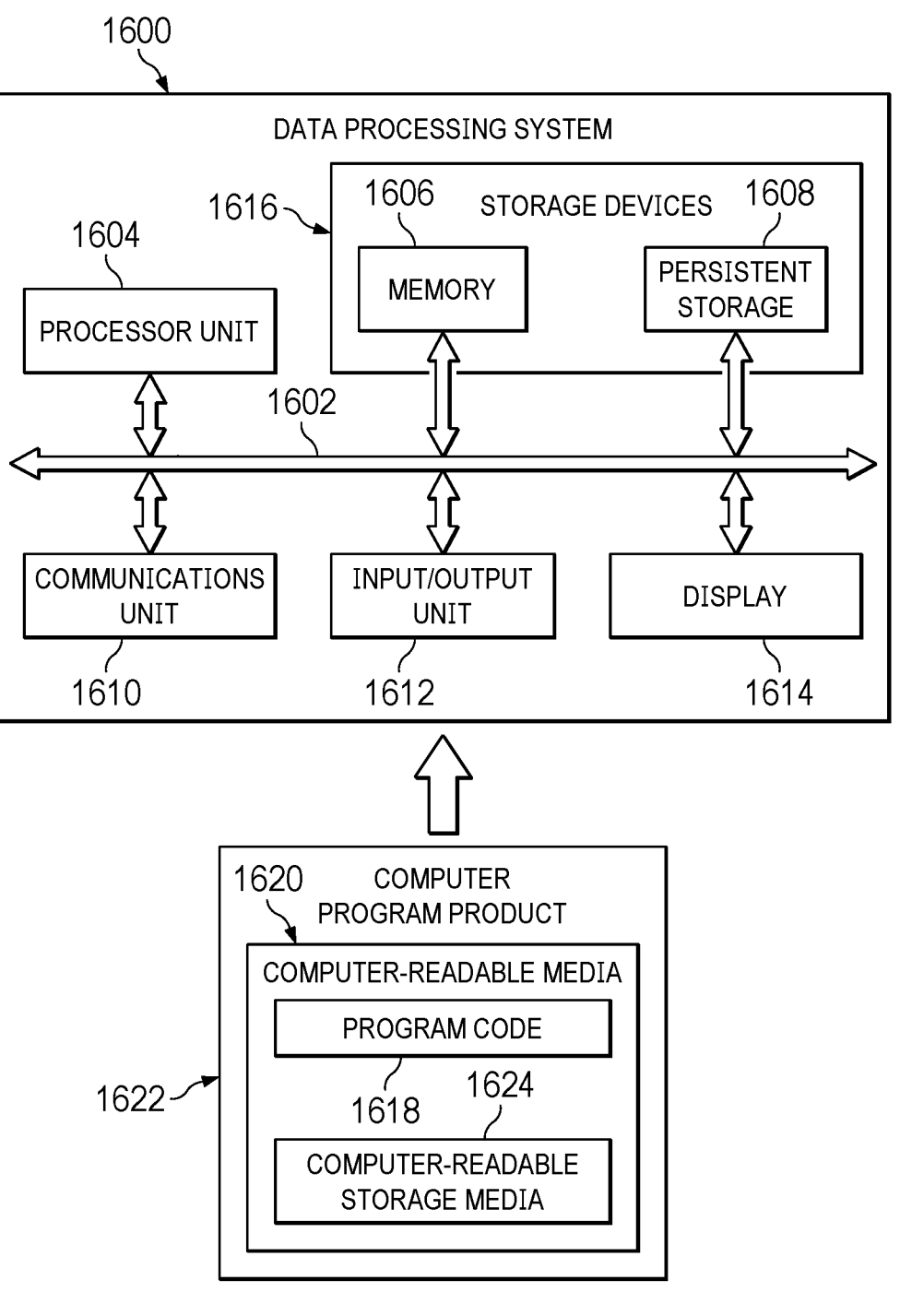
FIG. 16 is a block diagram of a data processing system in accordance with an illustrative embodiment.

Turning now to FIG. 16, a block diagram of a data processing system is depicted in accordance with an illustrative embodiment. Data processing system 1600 can be used to implement computers and computing devices in computing environment 100 in FIG. 1. Data processing system 1600 can also be used to implement computer system 208 in FIG. 2. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can may be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program instructions, computer usable program instructions, or computer-readable program instructions that can be read and executed by a processor in processor unit 1604. The program instructions in the different embodiments can be embodied on different physical or computer-readable storage media, such as memory 1606 or persistent storage 1608.

Program instructions 1618 is located in a functional form on computer-readable media 1620 that is selectively removable and can be loaded onto or transferred to data processing system 1600 for execution by processor unit 1604. Program instructions 1618 and computer-readable media 1620 form computer program product 1622 in these illustrative examples. In the illustrative example, computer-readable media 1620 is computer-readable storage media 1624.

Computer-readable storage media 1624 is a physical or tangible storage device used to store program instructions 1618 rather than a medium that propagates or transmits program instructions 1618. Computer-readable storage media 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1618 can be transferred to data processing system 1600 using a computer-readable signal media. The computer-readable signal media are signals and can be, for example, a propagated data signal containing program instructions 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program instructions 1618 can be located in computer-readable media 1620 in the form of a single storage device or system. In another example, program instructions 1618 can be located in computer-readable media 1620 that is distributed in multiple data processing systems. In other words, some instructions in program instructions 1618 can be located in one data processing system while other instructions in program instructions 1618 can be located in one data processing system. For example, a portion of program instructions 1618 can be located in computer-readable media 1620 in a server computer while another portion of program instructions 1618 can be located in computer-readable media 1620 located in a set of client computers.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, may be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program instructions 1618.

Thus, illustrative embodiments of the present invention provide a computer implemented method, computer system, and computer program product for a computer system that determines whether an object reference fetched by a load instruction has an expected value for heap protection for a heap in response to receiving the load instruction for execution. The computer system generates an event in response to the object reference not being the expected value, wherein the event is used to manage the object reference. According to other illustrative embodiments, a computer system and a computer program product for managing object references are provided. As a result, the illustrative embodiments can prevent a load instruction from loading of invalid object reference that does not point to a memory location in a heap.

The illustrative examples can decrease the occurrence of live object references pointing to other locations other than memory locations in a heap. The illustrative examples can restrict instructions from making reads to memory locations that are outside of the heap. These types of reads to memory locations outside of the heap are invalid reads.

The different illustrative examples can perform checks on load instructions that load live object references that should point to memory locations in a heap as the load instructions are received for execution. These checks reduce issues with live object references that are corrupted. The checks identify object references that are invalid. An invalid object reference is an object reference that does not point to a memory location in a memory range in a heap.

In the illustrative examples, memory corruption can be reduced. A reduction in memory corruption can reduce at least one of fatal exceptions, propagation of corruption to other parts of an application, incorrect program behavior, data integrity issues, security exposures from leaking objects, security exposure of the data, segmentation faults, or other issues can be reduced.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing object references, the computer implemented method comprising:
    determining, by a computer system, whether an object reference fetched by a load instruction has an expected value for heap protection for a heap before loading the object reference for use, in response to receiving the load instruction for execution;
    associating, by the computer system, a heap protection check with the load instruction, the heap protection check is used for heap protection and garbage collection, wherein heap protection control information defines a first range of memory locations for the heap for the heap protection, and wherein garbage collection control information defines a second range of memory locations for a subset of the heap for the garbage collection;
    determining, by the computer system, whether the object reference has the expected value using the first range of memory locations using the heap protection control information in response to performing the heap protection;
    determining, by the computer system, whether the object reference points to an object in the second range of memory locations for the garbage collection using the garbage collection control information in response to performing the garbage collection; and
    generating, by the computer system, an event in response to the object reference not being the expected value, wherein the event is used to manage the object reference.

2. The computer implemented method of claim 1 further comprising:
    loading the object reference in response to the object reference having the expected value.

3. The computer implemented method of claim 1, wherein the expected value for the object reference is one of a null value and a memory location within a range of memory locations in the heap.

4. The computer implemented method of claim 3, wherein the range of memory locations in the heap is at least one selected from a group consisting of: a portion of the heap and all of the heap.

5. The computer implemented method of claim 1, wherein the event is an interrupt to an interrupt handler that generates diagnostic information relating to the object reference.

6. The computer implemented method of claim 1, wherein associating the heap protection check with the load instruction comprises:
    adding a load guarded instruction in place of the load instruction, wherein the load guarded instruction causes a check of the object reference prior to completing a load of the object reference.

7. The computer implemented method of claim 1, wherein associating the heap protection check with the load instruction comprises:
    inserting a load guarded instruction prior to the load instruction, wherein the load guarded instruction causes a check of the object reference fetched in the load instruction.

8. A computer system comprising:
    a number of processor units, wherein the number of processor units executes program instructions to:
    determine whether an object reference in a load instruction has an expected value for heap protection for a heap before loading the object reference for use in response to receiving the load instruction;
    associate a heap protection check with the load instruction, the heap protection check is used for heap protection and garbage collection, wherein heap protection control information defines a first range of memory locations for the heap for the heap protection, and wherein garbage collection control information defines a second range of memory locations for a subset of the heap for the garbage collection;

determine whether the object reference has the expected value using the first range of memory locations using the heap protection control information in response to performing the heap protection;

determine whether the object reference points to an object in the second range of memory locations for the garbage collection using the garbage collection control information in response to performing the garbage collection; and generate an event in response to the object reference not being the expected value, wherein the event is used to manage the object reference.

9. The computer system of claim 8, wherein the number of processor units executes program instructions to:

load the object reference in response to the object reference having the expected value.

10. The computer system of claim 8, wherein the expected value for the object reference is one of a null value and a memory location within a range of memory locations in the heap.

11. The computer system of claim 10, wherein the range of memory locations in the heap is at least one selected from a group consisting of: a portion of the heap and all of the heap.

12. The computer system of claim 8, wherein the event is an interrupt to an interrupt handler that generates diagnostic information relating to the object reference.

13. The computer system of claim 8, wherein in associating the heap protection check with the load instruction, the number of processor units executes program instructions to:

add a load guarded instruction in place of the load instruction, wherein the load guarded instruction causes a check of the object reference prior completing a load of the object reference.

14. The computer system of claim 8, wherein in associating the heap protection check with the load instruction, wherein the number of processor units executes program instructions to:

insert a load guarded instruction prior to the load instruction, wherein the load guarded instruction causes a check of the object reference fetched by the load instruction.

15. A computer program product for managing object references, the computer program product comprising a computer readable storage medium having program instructions embodied therewith, the program instructions executable by a computer system to cause the computer system to perform a method of:

determining, by the computer system, whether an object reference fetched by a load instruction has an expected value for heap protection for a heap before loading the object reference for use, in response to receiving the load instruction;

associating, by the computer system, a heap protection check with the load instruction, the heap protection check is used for heap protection and garbage collection, wherein heap protection control information defines a first range of memory locations for the heap for the heap protection, and wherein garbage collection control information defines a second range of memory locations for a subset of the heap for the garbage collection;

determining, by the computer system, whether the object reference has the expected value using the first range of memory locations using the heap protection control information in response to performing the heap protection;

determining, by the computer system, whether the object reference points to an object in the second range of memory locations for the garbage collection using the garbage collection control information in response to performing the garbage collection; and generating, by the computer system, an event in response to the object reference not being the expected value, wherein the event is used to manage the object reference.

16. The computer program product of claim 15 further comprising:

loading the object reference in response to the object reference having the expected value.

17. The computer program product of claim 15, wherein the expected value for the object reference is one of a null value and a memory location within a range of memory locations in the heap.

18. The computer program product of claim 17, wherein the range of memory locations in the heap is at least one selected from a group consisting of: a portion of the heap and all of the heap.

19. The computer program product of claim 15, wherein the event is an interrupt to an interrupt handler that generates diagnostic information relating to the object reference.

20. The computer program product of claim 15, wherein associating the heap protection check with the load instruction comprises:

adding a load guarded instruction in place of the load instruction, wherein the load guarded instruction causes a check of the object reference prior to completing a load of the object reference.

* * * * *